(12) United States Patent
Chong et al.

(10) Patent No.: US 6,311,212 B1
(45) Date of Patent: Oct. 30, 2001

(54) SYSTEMS AND METHODS FOR ON-CHIP STORAGE OF VIRTUAL CONNECTION DESCRIPTORS

(75) Inventors: Simon Chong, Fremont; David A. Stelliga, Pleasanton; Ryszard Bleszynski, Cupertino; Anguo Tony Huang, Mountain View; Man Dieu Trinh, San Jose, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/270,287

(22) Filed: Mar. 16, 1999

Related U.S. Application Data

(60) Provisional application No. 60/090,939, filed on Jun. 27, 1998.

(51) Int. Cl.[7] .................................................. G06F 15/167
(52) U.S. Cl. .......................... 709/212; 709/250; 370/392; 370/397; 370/399; 370/409; 711/108; 365/49
(58) Field of Search ..................................... 709/212, 230, 709/238, 249, 250, 236; 370/381, 382, 392, 395, 399, 389, 397, 409; 711/3, 202, 206, 108, 203, 135; 365/49

(56) References Cited

U.S. PATENT DOCUMENTS

| | | | |
|---|---|---|---|
| 5,287,537 | * 2/1994 | Newmark et al. | 712/29 |
| 5,414,707 | * 5/1995 | Johnston et al. | 370/395 |
| 5,481,536 | 1/1996 | Reisch et al. | 370/394 |
| 5,515,370 | * 5/1996 | Rau | 370/399 |
| 5,517,488 | 5/1996 | Miyazaki et al. | 370/16 |
| 5,574,875 | * 11/1996 | Stansfield et al. | 711/3 |
| 5,619,650 | 4/1997 | Bach et al. | 395/200.01 |
| 5,640,399 | 6/1997 | Rostoker et al. | 370/392 |
| 5,652,872 | 7/1997 | Richter et al. | 703/26 |
| 5,684,797 | * 11/1997 | Aznar et al. | 370/390 |
| 5,684,954 | 11/1997 | Kaiserwerth et al. | 709/236 |

(List continued on next page.)

OTHER PUBLICATIONS

PCT Pattern Cooperation Treaty/US99/14263, date mailed Sep. 9, 1999.
Jim Handy, The Cache Memory Book, pp. 14–22, 1993.*
PCT Patent Cooperation Treaty/US99/14263, date mailed Sep. 9, 1999.

* cited by examiner

Primary Examiner—Mark H. Rinehart
Assistant Examiner—William C. Vaughn, Jr.
(74) Attorney, Agent, or Firm—Blakely, Sokoloff, Taylor & Zafman

(57) ABSTRACT

Systems and methods for storing, or caching, VC descriptors on a single-chip network processor to enhance system performance. The single-chip network processor includes an on-chip cache memory that stores VC descriptors for fast retrieval. When a VC descriptor is to be retrieved, a processing engine sends a VC descriptor identifier to a content-addressable memory (CAM), which stores VC descriptor identifiers in association with addresses in the cache where associated VC descriptors are stored. If the desired VC descriptor is stored in the cache, the CAM returns the associated address to the processing engine and the processing engine retrieves the VC descriptor from the cache memory. If the VC descriptor is not stored in the cache, the CAM returns a miss signal to the processing engine, and the processing engine retrieves the VC descriptor from an off-chip memory. In this manner, VC descriptors associated with high bandwidth VCs are stored to the cache and retrieved much quicker from the cache than from the off-chip memory.

30 Claims, 3 Drawing Sheets

U.S. PATENT DOCUMENTS

| | | | |
|---|---|---|---|
| 5,701,300 | 12/1997 | Jeon et al. | 370/392 |
| 5,726,985 * | 3/1998 | Daniel et al. | 370/382 |
| 5,751,951 | 5/1998 | Osborne et al. | 395/200.8 |
| 5,764,895 | 6/1998 | Chung | 709/250 |
| 5,796,978 * | 8/1998 | Yoshioka et al. | 711/206 |
| 5,812,550 * | 9/1998 | Sohn et al. | 370/395 |
| 5,841,772 * | 11/1998 | Daniel et al. | 370/395 |
| 5,848,068 | 12/1998 | Daniel et al. | 370/395 |
| 5,875,173 | 2/1999 | Ohgane et al. | 370/230 |
| 5,875,189 * | 2/1999 | Brownhill et al. | 370/395 |
| 5,905,874 | 5/1999 | Johnson | 395/200.8 |
| 5,920,561 | 7/1999 | Daniel et al. | 370/395 |
| 5,956,336 * | 9/1999 | Loschke et al. | 370/392 |
| 5,974,466 * | 10/1999 | Mizutani et al. | 709/236 |
| 5,978,951 * | 11/1999 | Lawler et al. | 714/758 |
| 5,983,332 * | 11/1999 | Watkins | 711/202 |
| 5,991,854 * | 11/1999 | Watkins | 711/135 |
| 6,003,027 * | 12/1999 | Prager | 707/5 |
| 6,026,467 * | 2/2000 | Petty | 711/108 |
| 6,076,141 * | 6/2000 | Tremblay et al. | 711/108 |
| 6,105,110 * | 8/2000 | Watkins | 711/135 |
| 6,108,708 * | 8/2000 | Iwata | 709/238 |
| 6,128,303 * | 10/2000 | Bergantino et al. | 370/398 |

SYSTEMS AND METHODS FOR ON-CHIP STORAGE OF VIRTUAL CONNECTION DESCRIPTORS

CROSS-REFERENCES TO RELATED APPLICATIONS

This application is related to U.S. Provisional patent application Ser. No. 60/090,939, filed Jun. 27, 1998, entitled "Network Accelerator Subsystem Based on Single-Chip Network Processor and Interface Protocol," the disclosure of which is hereby incorporated by reference in its entirety.

BACKGROUND OF THE INVENTION

The present invention relates in general to processing Virtual Connection Descriptors in networking systems, and more particularly to on-chip storage of Virtual Connection Descriptors on a single-chip network processing device to enhance system performance.

The need for faster communication among computers and other systems requires ever faster and more efficient networks. Today, networks typically use an amalgam of various software and hardware to implement a variety of network functions and standards. Network devices such as client computer systems, servers, hubs, routers, switches, network backbones, etc., are each complex devices that require digital processing in hardware and software to facilitate network communication. Some tasks performed in a network device include translation between different network standards such as Ethernet and Asynchronous Transfer Mode (ATM), reformatting of data, traffic scheduling, routing of data cells, packets messages, etc. Depending on the particular protocol being implemented, some tasks may be performed at different points in the network.

In conventional networking systems that implement asynchronous Transfer Mode (ATM), data traffic is handled by a Virtual Channel, or Virtual Connection (VC). There are typically many VCs in each system and each VC has its own characteristics, such as packet type, packet size and protocols. Therefore, each VC requires its own descriptor that identifies the particular VC and its characteristics and requirements. In a typical system, the VC descriptors are stored in the system memory. In order to process data for a VC (whether for receiving or transmitting data for a particular VC), the system reads the associated VC descriptor from the system memory, and then processes and updates the VC descriptor. However, system memories typically have limited bandwidth and slow memory access times, so data transfer performance and network efficiency can be degraded when accessing and processing VC descriptors stored on system memory. This is especially the case when processing data for certain VCs, such as VCs for real-time video or voice, which require high bandwidth and fast memory access times for optimal performance. Accordingly, what is needed in the art are techniques for improving the ability of a network device to process VC descriptors quicker so as to provide increased throughput and enhanced network efficiency.

SUMMARY OF THE INVENTION

The present invention provides techniques for storing, or caching, VC descriptors on a network processor to enhance system performance. In particular, the techniques of the present invention significantly increase throughput and reduce the bandwidth needed in the system memory to fetch, process and update VC descriptors.

According to the invention, a network processor includes an on-chip cache memory that stores VC descriptors for fast retrieval. When a VC descriptor is to be retrieved, a processing engine sends a VC descriptor identifier to a content-addressable memory (CAM), which stores VC descriptor identifiers in association with addresses in the cache where associated VC descriptors are stored. If the desired VC descriptor is stored in the cache, the CAM returns the associated address to the processing engine and the processing engine retrieves the VC descriptor from the cache memory. If the VC descriptor is not stored in the cache, the CAM returns a miss signal to the processing engine, and the processing engine retrieves the VC descriptor from an off-chip memory. In this manner, VC descriptors associated with high bandwidth VCs are stored to the cache and retrieved much quicker from the cache than from the off-chip memory.

According to an aspect of the invention, a networking system device is provided for use in network communication applications. The device typically comprises a network processor and an external local memory for storing a first plurality of virtual connection descriptors (VCDs). The network processor typically includes a cache memory for storing a second plurality of VCDs, a processing engine, coupled to the local memory and to the cache memory, for processing VCDs, and a content-addressable memory (CAM), coupled to the processing engine, wherein the CAM stores cache addresses of the second plurality of VCDs stored in the cache memory. In typical operation, the processing engine sends a first VCD identifier associated with a first VCD to the CAM, wherein the CAM reads the first VCD identifier and responds to the processing engine with one of a hit signal indicating that the first VCD is stored in the cache memory and a miss signal indicating that the first VCD is not stored in the cache memory. The processing engine accesses the first VCD in the cache memory if the hit signal is received, and the processing engine accesses the first VCD in the external local memory if the miss signal is received.

According to another aspect of the invention, a method is provided for locating virtual connection descriptors (VCDs) in a networking device that includes a processor coupled to a first memory for storing a first plurality of VCDs. The processor typically has a processing engine, a second memory for storing a second plurality of VCDs, and a content-addressable memory (CAM) that stores addresses of the VCDs stored in the second memory. The method typically comprises the steps of sending a first identifier from the processing engine to the CAM, wherein the first identifier is associated with a first VCD; determining in the CAM whether the first VCD is stored in the second memory; and responding to the processing engine with one of a hit signal if the first VCD is stored in the second memory and a miss signal if the first VCD is not stored in the second memory.

According to yet another aspect of the invention, a network device is provided for use in network communication applications. The device is coupled to a local memory for storing a first plurality of virtual connection descriptors (VCDs). The device typically comprises a cache memory for storing a second plurality of VCDs; a processing engine, coupled to the local memory and to the cache memory, for processing VCDs; and a content-addressable memory (CAM), coupled to the processing engine, wherein the CAM stores cache addresses of the second plurality of VCDs stored in the cache memory. In typical operation, the processing engine sends a first VCD identifier associated with a first VCD to the CAM, wherein the CAM reads the first VCD identifier and responds to the processing engine with one of a hit signal indicating that the first VCD is stored in the cache memory and a miss signal indicating that the first VCD is not stored in the cache memory.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
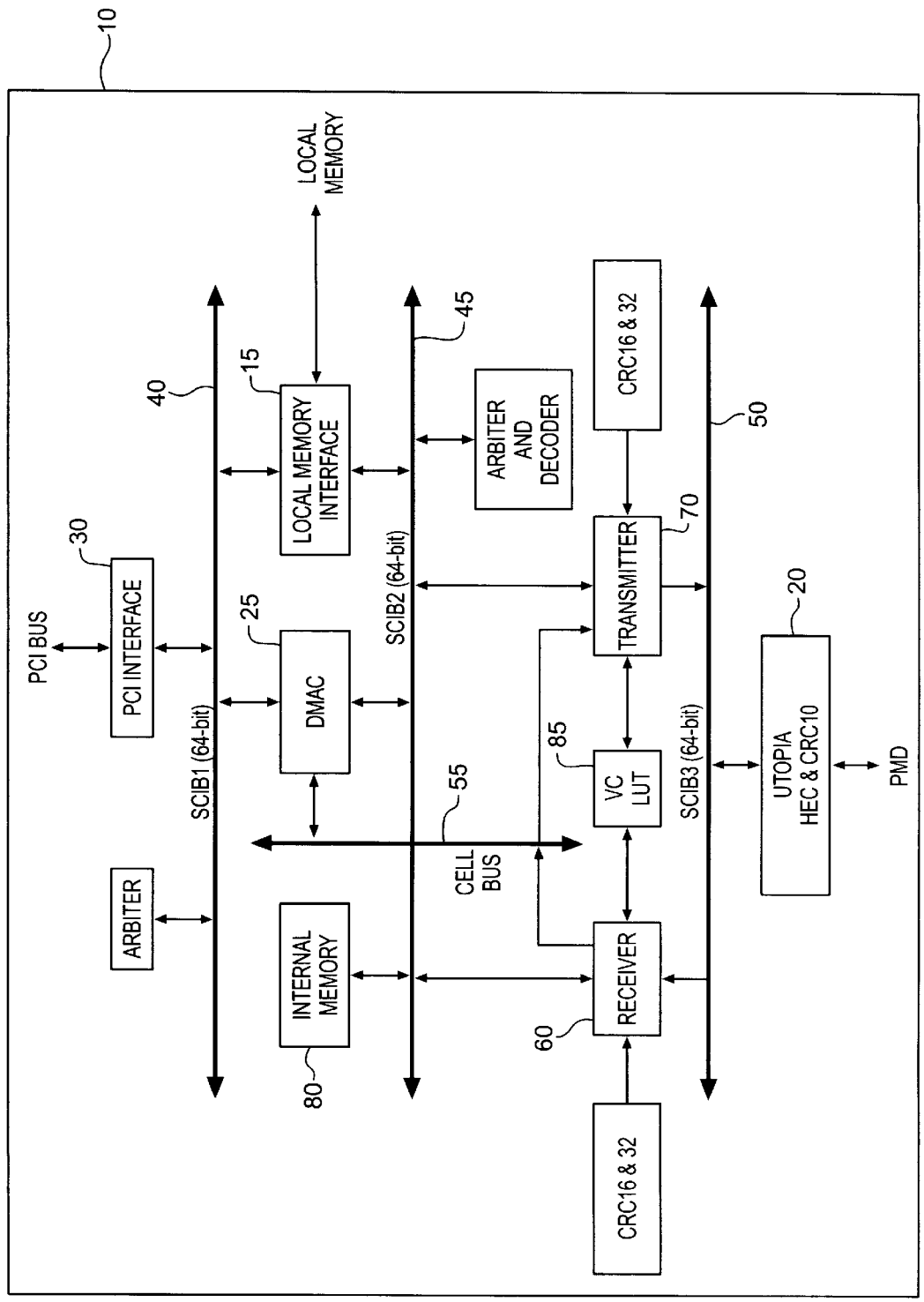
FIG. 1 is a block diagram of the architecture of a network processing engine according to an embodiment of the present invention.

FIG. 1 is a block diagram of the architecture of a network processing engine 10 according to an embodiment of the present invention. In preferred aspects, the network processing engine of the present invention is useful for a variety of network communications applications including implementation in multi-protocol network interface cards (NICs), server NICs, workgroup, IP and ATM switches, multi-protocol and IP routers, ATM backbone switch applications, multi-protocol/ATM adapters and the like. In preferred aspects, all components of processing engine 10 reside on a single chip (e.g., a single silicon chip), but all components may be spread across many chips such that processing engine 10 is implemented using many chips. Processing engine 10 includes a local memory interface block 15, UTOPIA interface 20, Direct Memory Access Controller (DMAC) 25, PCI interface 30, first internal bus 40, second internal bus 45, third internal bus 50, and cell bus 55. Processing engine 10 also includes an internal memory 80 and a receiver block 60 and a transmitter block 70 for processing incoming and outgoing data transmissions, respectively, over a communications interface, such as UTOPIA interface 20. Local memory interface block 15 provides a connection to a local (off-chip) system memory, such as DRAM, SRAM, SDRAM, SSRAM or any combination thereof. DMAC 25 provides control of data transfers between external memories (PCI), internal memory 80 and the local memory. Internal memory 80 is used in one embodiment to store VC descriptors on-chip as will be described below in more detail.

PCI interface 30 provides a connection to external intelligence, such as a host computer system, and external packet memories. First and second internal buses 40 and 45 in one embodiment are non-multiplexed 32 bit address and 64 bit data buses. Depending on the desired line rate, PCI interface 30 is configured to run at frequencies up to 33 MHz over a 32 bit PCI bus, or at frequencies up to 66 MHz over a 64 bit PCI bus. For example, to achieve a 622 Mbps line rate, a 64 bit interface is used with frequencies up to 66 MHz. UTOPIA interface 20 supports connections to a broad range of layer 1 physical interfaces, including, for example, OC-1, OC-3, OC-12, OC-48 and DS-3 interfaces. To support a 622 Mbps line rate, the UTOPIA data bus is 16 bits, whereas for a 155 Mbps line rate the UTOPIA bus is 8 bits. Third internal data bus 50 is an 8 or 16 bit UTOPIA compatible interface. Cell bus 55 is a 64 bit data path and is used to transfer cells or frames between internal cell/frame buffers of receiver block 60 and transmitter block 70 and the PCI memory space through DMAC 25. Cell bus 55 allows several transactions to occur in parallel. For example, data payload transfers and descriptor data movement may occur simultaneously. Additionally, for a 622 Mbps line rate, cell bus 55 is capable of off-loading up to 160 MBps of bandwidth from local memory.

Figure 2:
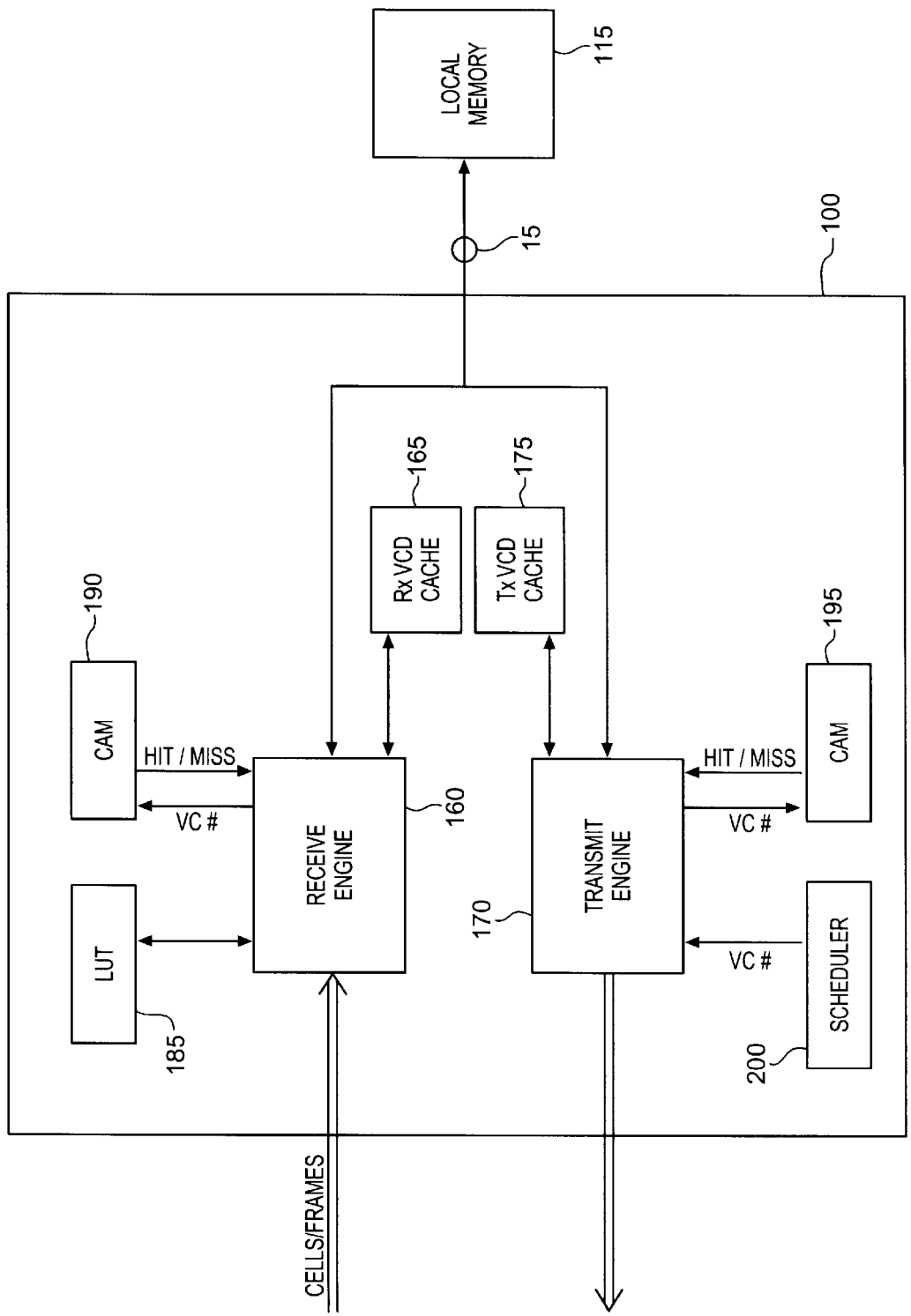
FIG. 2 is a simplified block diagram of a single-chip network processing device according to an embodiment of the present invention.

FIG. 2 is a simplified block diagram of a single-chip network processing device 100 according to an embodiment of the present invention. Single-chip processing device 100 includes a receive VC descriptor RAM cache 165 (hereinafter "Rx cache 165") coupled to receive processor engine 160, and a transmit VC descriptor RAM cache 175 (hereinafter "Tx cache 175") coupled to transmit processor engine 170. Rx cache 165 and Tx cache 175 each comprise a fast access memory, and are each dedicated to receiver engine 160 and transmit engine 170, respectively. Receiver engine 160 and transmit engine 170 are both coupled to local memory 115, which is external to single-chip device 100, via local memory interface 15 of FIG. 1 (not shown in FIG. 2). In an alternate embodiment, Tx cache 175 and Rx cache 165 comprise one integral memory such as a portion of internal memory 80 of FIG. 1. According to this embodiment, for example, internal memory 80 is of sufficient size to store up to 128 VC descriptors. For applications requiring more than 128 VCs, local memory 115 is required to store additional VC descriptors. For example, to support 1024 VCs, approximately 64 Kbytes of local memory is required to store the associated VC descriptors. For applications requiring small numbers of VCs, the use of local memory to store VC descriptors is not needed and can be eliminated if desired. In preferred aspects, for applications requiring more than 128 VCs, VC descriptors for delay sensitive and/or high bandwidth VCs are stored to internal memory 80 while VC descriptors for low bandwidth VCs are stored to local memory 115.

In the receive direction, receiver engine 160 reassembles incoming cells or frames into packets. In one embodiment, receiver engine 160 operates in an ATM termination mode wherein cells are reassembled into packets. In another embodiment, receiver engine 160 operates in a Router Interface mode where frames are reassembled into packets. In the ATM termination mode of operation, for example, upon cell arrival receiver engine 160 extracts and processes the cell header simultaneously, and passes the cell payload to either an internal cell buffer, internal memory 80 or local memory 115.

Upon receiving a cell for a VC that has been registered, receiver engine 160 determines the VCD address using an information field from the cell header, such as the VCI/VPI field. In particular, receiver engine 160 reads the necessary information in the information field (e.g., VCI/VPI field) from within the cell header and forwards this information to look-up module 185. Look-up module 185 performs the necessary translation to determine the VC identifier (VC-ID) and returns the VC-ID to receiver engine 160.

After the VC-ID has been determined, the VCD is fetched by receiver engine 160. In one embodiment, the VCDs are stored in Rx cache 165. This embodiment is useful for delay sensitive and high bandwidth applications, because the access time for Rx cache 165 is typically much shorter than for local memory 115. In this embodiment, for example, all VCDs are initially stored to Rx cache 165 until capacity is reached. Thereafter, a priority scheme such as FIFO, or a scheme based on bandwidth requirements, is used to determine which VCDs are replaced as newer VCDs associated with high bandwidth applications are created. In this embodiment, content-addressable memory (CAM) 190 is provided for storing the addresses of the VCDs stored in Rx cache 165 in association with the VC-IDs. For each VCD stored in Rx cache 165 there is an entry in CAM 190 linking the VC-ID with the address in RX cache 165 where the associated VCD is stored.

In operation, when receiver engine 160 desires to fetch a VCD, receiver engine 160 sends the VC-ID associated with the particular VCD to CAM 190. If the particular VCD is stored to Rx cache 165, CAM 190 responds to receiver engine 160 with a hit signal. In preferred aspects, the hit signal includes the address in Rx cache 165 where the particular VCD is stored. Receiver engine 160 uses this address to access the VCD in Rx cache 165 without having to access the VCD in local memory 115. If the VCD is not stored in Rx cache 165, CAM 190 returns a miss signal to receiver engine 160, and receiver engine 160 retrieves the VCD from local memory 115. In this manner, those VCDs stored in Rx cache 165 are retrieved and processed much quicker than those VCDs stored only in local memory 115.

Figure 3:
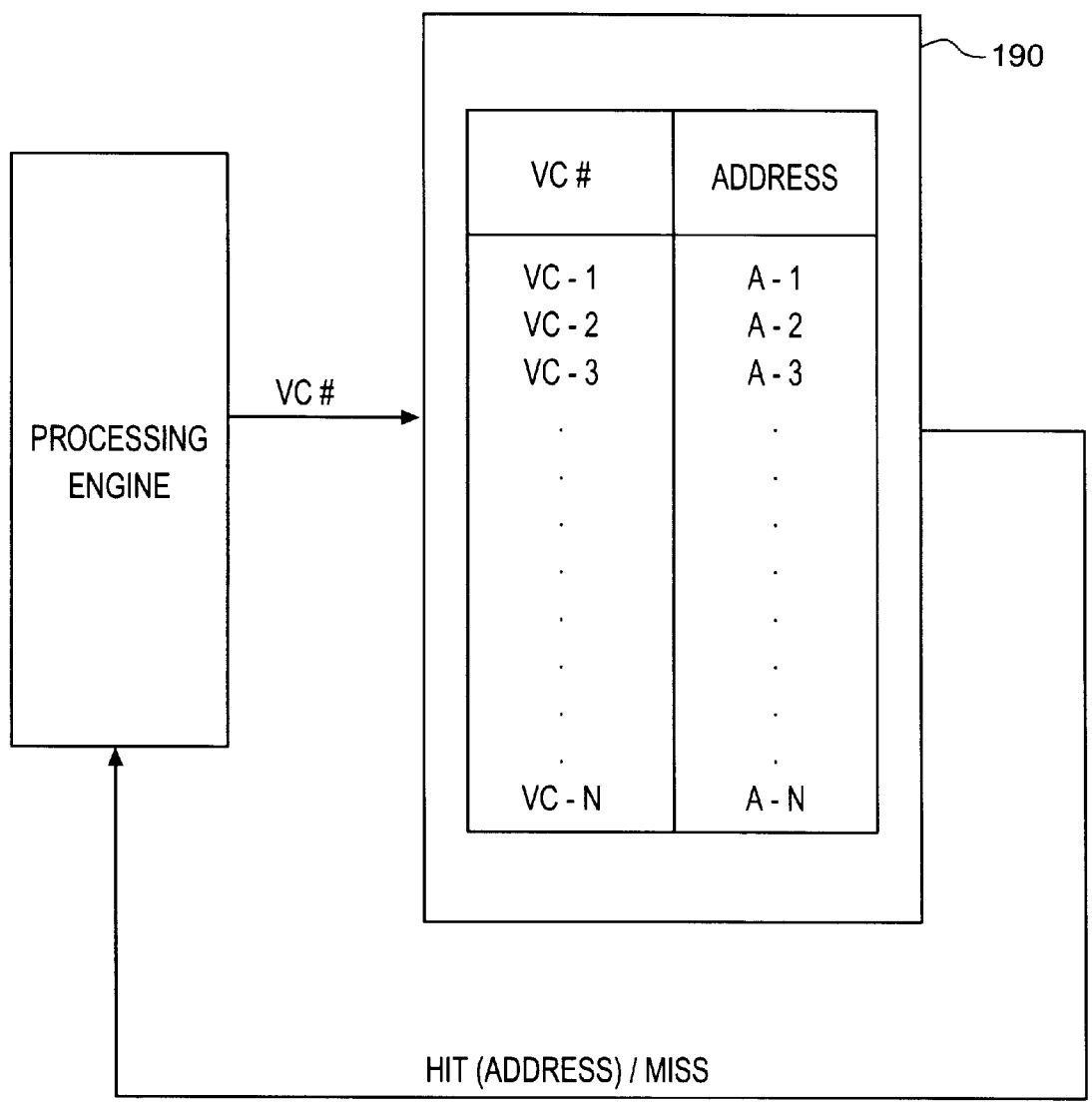
FIG. 3 illustrates an exemplary embodiment of a content-addressable memory (CAM) according to the present invention.

FIG. 3 illustrates an exemplary embodiment of CAM 190 according to the present invention. As shown CAM 190 includes a list of VC-IDs associated with the VCDs that have been stored to Rx cache 165. Associated with each VC-ID is the address in Rx cache 165 where the associated VCD is stored. When CAM 190 receives a VC-ID, the VC-ID list is checked. If there is no match, CAM 190 returns a miss signal. If there is a match, CAM 190 returns a hit signal with the associated address. For example, if VC-ID VC-2 is received, a hit signal including address A-2 is returned.

In the transmit direction, when a transmission is to take place for a particular VC, transmit engine 170 fetches the associated VCD and creates a data structure that is queued for DMA transfer. Transmit engine 170 segments packets into cells or frames and processes VCDs to determine the appropriate formatting and characteristics required for the associated VC. For each VC, packets are queued in the data structure for DMA transfer. In preferred aspects, the data structure is a two-dimensional link list. For each VC, transmitter engine 170 de-queues the data structure and transmits the payload to the desired destination. Transmit engine 170 is capable of accepting data packets and transmitting the data using, for example, PPP or Frame Relay encapsulation into the SONET interface.

As shown in FIG. 2, device 100 includes a scheduler 200 coupled to transmit engine 170. When a transmission is scheduled for a particular VC, scheduler 200 sends the VC-ID to transmit engine 170. In one embodiment, certain VCDs are stored to Tx cache 175. This embodiment is useful for delay sensitive and high bandwidth applications, because the access time for Tx cache 175 is typically much shorter than for local memory 115. In this embodiment, for example, all VCDs are initially stored to Tx cache 175 until capacity is reached. Thereafter, a priority scheme such as FIFO, or a bandwidth requirement based scheme, is used to determine which VCDs are replaced as newer VCDs associated with high bandwidth applications are introduced.

After the VC-ID has been received, the VCD is fetched by transmit engine 170. In one embodiment, the VCD is stored in Tx cache 175. In this embodiment, content-addressable memory (CAM) 195 is provided for storing the addresses of the VCDs stored in Tx cache 175 in association with the VC-ID. For each VCD stored in Tx cache 175 there is an entry in CAM 195 linking the VC-ID with the address in Tx cache 175 where the associated VCD is stored. CAM 195 is designed and operates similar to CAM 190 as shown in detail in FIG. 3.

In operation, when transmit engine 170 desires to fetch a VCD, transmit engine 170 sends the VC-ID associated with the particular VCD to CAM 195. If the particular VCD is stored to Tx cache 175, CAM 195 responds to transmit engine 170 with a hit signal. In preferred aspects, the hit signal includes the address in Tx cache 175 where the particular VCD is stored. Transmit engine 170 uses this address to access the VCD in Tx cache 175 without having to access the VCD in local memory 115. If the VCD is not stored in Tx cache 175, CAM 195 returns a miss signal to transmit engine 170, and transmit engine 170 retrieves the VCD from local memory 115. In this manner, those VCDs stored in Tx cache 175 are retrieved and processed much quicker than those VCDs stored only in local memory 115.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although two separate caches (Tx cache 175 and Rx cache 165) are shown to store VCDs, a single on-chip memory unit, coupled to both receive engine 160 and transmit engine 170, can be used. Likewise, a single CAM, coupled to both receive engine 160 and transmit engine 170, can be used in conjunction with the single memory unit to determine addresses for VCDs stored in that memory unit. Therefore, the scope of the appended claims should be accorded the broadest interpretation so as to encompass all such modifications and similar arrangements.

What is claimed is:

1. A networking system device comprising:
   a local memory for storing a first plurality of virtual connection descriptors (VCDs); and
   a network processor, including:
   a) a cache memory for storing a second plurality of VCDs;
   b) a processing engine, coupled to the local memory and to the cache memory, for processing VCDs; and
   c) a content-addressable memory (CAM), coupled to the processing engine, wherein the CAM stores cache addresses of the second plurality of VCDs stored in the cache memory;
   wherein the processing engine sends a first VCD identifier associated with a first VCD to the CAM, wherein the CAM reads the first VCD identifier and responds to the processing engine with one of a hit signal indicating that the first VCD is stored in the cache memory and a miss signal indicating that the first VCD is not stored in the cache memory, wherein the processing engine accesses the first VCD in the cache memory if the hit signal is received, and wherein the processing engine accesses the first VCD in the local memory in response to the miss signal.

2. The device of claim 1, wherein the network processor is implemented on a single chip.

3. The device of claim 1, wherein the processing engine is a transmit processing engine, wherein the network processor includes a scheduler, and wherein the scheduler sends the first VCD identifier to the transmit processing engine when a transmission is scheduled for a first virtual connection (VC) associated with the first VCD.

4. The device of claim 1, wherein the processing engine is a receive processing engine that processes incoming ATM cells, wherein each ATM cell includes a header field, wherein the network processor includes a look-up module that maps ATM header information fields into VCD identifiers, wherein when a first ATM cell is received for a first virtual connection (VC), the processor forwards the first ATM header information field to the look-up module, and wherein the look-up module returns the first VCD identifier to the receive processing engine.

5. A method of locating virtual connection descriptors (VCDs) in a networking device, the device including a processor coupled to a first memory for storing a first plurality of VCDs, and the processor including a processing engine, a second memory for storing a second plurality of VCDs, and a content-addressable memory (CAM) that stores addresses of the second plurality of VCDs stored in the second memory, the method comprising:
sending a first identifier from the processing engine to the CAM, wherein the first identifier is associated with a first VCD;
determining in the CAM whether the first VCD is stored in the second memory; and
responding to the processing engine with one of a hit signal if the first VCD is stored in the second memory and a miss signal if the first VCD is not stored in the second memory.

6. The method of claim 5, wherein the processor is implemented on a single chip.

7. The method of claim 5, wherein the hit signal includes the address of the first VCD in the second memory, the method further comprising accessing the first VCD in the second memory if the processor receives the hit signal.

8. The method of claim 5, further comprising
accessing the first VCD in the first memory if the processor receives the miss signal.

9. The method of claim 5, wherein the processing engine is a receive processing engine for processing incoming ATM cells, the method further comprising:
receiving a first ATM cell associated with a first virtual connection (VC), the first ATM cell having a header field; and
processing the ATM header field so as to obtain the first identifier.

10. The method of claim 9, wherein the processor includes a look-up module that maps ATM header information fields into VCD identifiers, wherein a first ATM header information field is associated with the first VCD identifier, wherein said processing the header field includes:
obtaining the first ATM header information field from the first ATM header field;
forwarding the first ATM header information field to the look-up module;
determining whether the first ATM header information field is associated with any of the VCD identifiers; and
returning the first VCD identifier to the processing engine.

11. The method of claim 5, wherein the processing engine is a transmit processing engine, wherein the processor includes a scheduler coupled to the processing engine, the method further comprising
sending the first identifier from the scheduler to the processing engine when a transmission is scheduled for a first virtual connection (VC) associated with the first VCD.

12. A single-chip network device, wherein the device is coupled to a local memory for storing a first plurality of virtual connection descriptors (VCDs), the device comprising:
a) a cache memory for storing a second plurality of VCDs;
b) a processing engine, coupled to the local memory and to the cache memory, for processing VCDs; and
c) a content-addressable memory (CAM), coupled to the processing engine, wherein the CAM stores cache addresses of the second plurality of VCDs stored in the cache memory;
wherein the processing engine sends a first VCD identifier associated with a first VCD to the CAM, wherein the CAM reads the first VCD identifier and responds to the processing engine with one of a hit signal indicating that the first VCD is stored in the cache memory and a miss signal indicating that the first VCD is not stored in the cache memory.

13. The device of claim 12, wherein the processing engine accesses the first VCD in the cache memory if the hit signal is received, and wherein the processing engine accesses the first VCD in the local memory if the miss signal is received.

14. The device of claim 12, wherein if the first VCD is stored in the cache memory, the CAM responds to the processing engine with the address for the first VCD in the cache memory.

15. The device of claim 12, wherein the hit signal includes the cache address of the first VCD.

16. The device of claim 12, wherein the processing engine is a transmit processing engine, wherein the single-chip device further comprises a scheduler, and wherein the scheduler sends the first VCD identifier to the processing engine when a transmission is scheduled for a first virtual connection (VC) associated with the first VCD.

17. The device of claim 12, wherein the processing engine is a receive processing engine that processes incoming ATM cells, wherein each ATM cell includes a header field, wherein the single-chip network processor includes a look-up module that maps ATM header information fields into VCD identifiers, wherein when a first ATM cell is received for a first virtual connection (VC), the processor forwards the first ATM header information field to the look-up module, and wherein the look-up module returns the first VCD identifier to the processing engine.

18. A networking system device comprising:
a local memory to store a first plurality of virtual connection descriptors (VCDs); and
a network processor, including:
a) a cache memory to store a second plurality of VCDs;
b) a processing engine, coupled to the local memory and to the cache memory, to process VCDs; and
c) a content-addressable memory (CAM), coupled to the processing engine, to store cache addresses of the second plurality of VCDs stored in the cache memory, each cache address being cross-referenced to a VCD identifier associated with one of the second plurality of VCDs;
the device having the processing engine send a first VCD identifier associated with a first VCD to the CAM that reads the first VCD identifier and responds to the processing engine with one of:
a hit signal indicating that the first VCD identifier has a corresponding cache address in the CAM, the processing engine then accessing the first VCD in the cache memory using the corresponding cache address; and a miss signal indicating that the first VCD identifier does not have a corresponding cache address in the CAM, the processing engine then accessing the first VCD in the local memory.

19. The device of claim 18, wherein the processing engine is a transmit processing engine, wherein the network processor includes a scheduler, and wherein the scheduler sends the first VCD identifier to the transmit processing engine when a transmission is scheduled for a first virtual connection (VC) associated with the first VCD.

20. The device of claim 18, wherein the processing engine is a receive processing engine that processes incoming ATM cells, wherein each ATM cell includes a header field, wherein the network processor includes a look-up module that maps ATM header information fields into VCD identifiers, wherein when a first ATM cell is received for a first virtual connection (VC), the processor forwards the first ATM header information field to the look-up module, and wherein the look-up module returns the first VCD identifier to the receive processing engine.

21. An apparatus comprising:
a cache to store a first set of virtual connection descriptors (VCDs);
a content-addressable memory (CAM) to store cache memory addresses, each cache memory address linked to a VCD identifier that corresponds to a given one of the first set of VCDs, the CAM having the capability to determine if a VCD resides in the cache when the CAM receives a VCD identifier by:
searching for the received VCD identifier to determine if a corresponding cache address exists in the CAM for the received VCD identifier; and
returning one of a hit signal if a corresponding cache address exists for the received VCD identifier, the hit signal including the corresponding cache address, and a miss signal if the corresponding cache address does not exist for the received VCD identifier;
a processing engine coupled to the cache and the CAM to process VCDs by:
receiving a VCD identifier associated with a given VCD;
sending the VCD identifier to the CAM for the CAM to determine if the associated VCD exists in the cache; and
performing one of the following in response to the CAM returning one of a hit signal and a miss signal by:
accessing the given VCD from the cache if the CAM returns a hit signal; and
accessing the given VCD from a different memory if the CAM returns a miss signal.

22. The apparatus of claim 21, wherein the cache is on-chip, and the different memory is off-chip.

23. The apparatus of claim 21, wherein the network processor is implemented on a single chip.

24. A system comprising:
a first memory having a first set of virtual connection descriptors (VCDs);
a network processor having:
a second memory to store a second set of VCDs;
a content-addressable memory (CAM) to store memory addresses of the second memory, each memory address linked to a VCD identifier that corresponds to one of the second set of VCDs, the CAM having the capability to determine if a VCD resides in the second memory when the CAM receives a VCD identifier by:
searching for the received VCD identifier to determine if a corresponding memory address exists in the CAM for the received VCD identifier; and
returning one of a hit signal if a corresponding memory address exists for the received VCD identifier and a miss signal if a corresponding memory address does not exist for the received VCD identifier;
a processing engine coupled to the first memory, second memory, and CAM, to process VCDs by:
receiving a VCD identifier associated with a given VCD;
sending the VCD identifier to the CAM for the CAM to determine if the associated VCD exists in the second memory; and
performing one of the following in response to the CAM returning one of a hit signal and a miss signal by:
accessing the given VCD from the second memory if the CAM returns a hit signal; and
accessing the given VCD from the first memory if the CAM returns a miss signal.

25. The system of claim 24, wherein the first memory comprises an off-chip memory, and the second memory comprises an on-chip memory.

26. The system of claim 24, wherein the processing engine is a transmit processing engine, wherein the network processor includes a scheduler, and wherein the scheduler sends the first VCD identifier to the transmit processing engine when a transmission is scheduled for a first virtual connection (VC) associated with the first VCD.

27. The system of claim 24, wherein the processing engine is a receive processing engine that processes incoming ATM cells, wherein each ATM cell includes a header field, wherein the network processor includes a look-up module that maps ATM header information fields into VCD identifiers, wherein when a first ATM cell is received for a first virtual connection (VC), the processor forwards the first ATM header information field to the look-up module, and wherein the look-up module returns the first VCD identifier to the receive processing engine.

28. A method comprising:
receiving a virtual connection descriptor (VCD) identifier associated with a given VCD;
sending the VCD identifier to a content-addressable memory (CAM) for the CAM to determine if the associated VCD exists in an on-chip memory, the CAM making this determination by searching for the VCD identifier in the CAM to determine if a corresponding on-chip memory address exists for the VCD identifier, and the CAM to return one of a hit signal if a corresponding on-chip memory address exists and a miss signal if a corresponding on-chip memory address does not exist; and
performing one of the following in response to the CAM returning one of a hit signal and a miss signal by:
accessing the given VCD from the on-chip memory if the CAM returns a hit signal; and
accessing the given VCD from an off-chip memory if the CAM returns a miss signal.

29. The method of claim 28, wherein the hit signal includes the address of the first VCD in the on-chip memory.

30. The method of claim 28, wherein the on-chip memory is a cache.

* * * * *